(12) United States Patent
Okamoto et al.

(10) Patent No.: US 7,948,600 B2
(45) Date of Patent: May 24, 2011

(54) MANUFACTURING METHOD OF DISPLAY DEVICE

(75) Inventors: Masataka Okamoto, Chonan (JP); Shigeru Matsuyama, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 260 days.

(21) Appl. No.: 12/432,816

(22) Filed: Apr. 30, 2009

(65) Prior Publication Data

US 2009/0275158 A1    Nov. 5, 2009

(30) Foreign Application Priority Data

Apr. 30, 2008  (JP) ................................ 2008-118105

(51) Int. Cl.
*G02F 1/13*    (2006.01)
(52) U.S. Cl. ........................................................ 349/187
(58) Field of Classification Search .................. 349/187
See application file for complete search history.

(56) References Cited

U.S. PATENT DOCUMENTS

| 2005/0118921 A1* | 6/2005 | Jung .............................. 445/24 |
| 2007/0153219 A1* | 7/2007 | Kim .............................. 349/187 |
| 2009/0103010 A1* | 4/2009 | Okamoto et al. ................ 349/73 |

FOREIGN PATENT DOCUMENTS

JP    2004-123936    4/2004

* cited by examiner

*Primary Examiner* — Sung H Pak
(74) *Attorney, Agent, or Firm* — Antonelli, Terry, Stout & Kraus, LLP.

(57) ABSTRACT

A liquid crystal display device having high quality and high reliability is manufactured by preventing the occurrence of damages on a terminal portion due to the radiation of laser beams in cutting a substrate of the display device which is formed using a plastic substrate by the radiation of laser beams. A first substrate has a cutting line at a position which faces a terminal portion of a second substrate. In cutting the first substrate along the cutting line, laser beams are radiated to the first substrate along the cutting line so as to form a groove having a predetermined depth in the first substrate. Then, a load is applied to the first substrate along the groove so as to cut the first substrate.

20 Claims, 7 Drawing Sheets

MANUFACTURING METHOD OF DISPLAY DEVICE

The present application claims priority from Japanese application JP2008-118105 filed on Apr. 30, 2008, the content of which is hereby incorporated by reference into this application.

BACKGROUND OF THE INVENTION

1. Field of the Invention

The present invention relates to a manufacturing method of a display device, and more particularly to a manufacturing method of a display device using a display panel which is formed such that a plurality of display panels is formed on a large-sized mother board and, thereafter, the mother board is divided into individual display panels by cutting. The present invention, more particularly, relates to a manufacturing method of a liquid crystal display device.

2. Description of the Related Art

Recently, a demand for making a display device flexible has been increasing. The development of a plastic substrate made of a flexible base material which can cope with such a demand has been in progress. In the manufacture of an existing display device, more particularly to a liquid crystal display device, there has been adopted a so-called multiple-cell simultaneously manufacturing method in which, on one sheet of mother board (large-sized board or a large board) which uses glass as a base material, a thin film transistor (TFT) board on which a plurality of liquid crystal display panels are mounted, and a large-sized color filter (CF) board on which a plurality of liquid crystal display panels are mounted in the same manner are overlapped and adhered to each other and, thereafter, the overlapped large boards are cut into individual liquid crystal display panels.

Here, each liquid crystal display panel mounted on the TFT board includes a portion where terminals for electrical connection with an external power source are formed, that is, a so-called terminal portion. Accordingly, in cutting the CF board in the above-mentioned cutting operation, it is necessary to cut a portion of the CF board which faces the terminal portion without damaging the terminal portion.

Accordingly, in cutting the liquid crystal display panel which uses the glass substrate, flaws are formed on a back surface side of the glass, a force is applied to the substrate such that a tensile stress is applied to the flaw so as to grow the flaws on the substrate surface in the vertical direction and hence, the glass substrate is broken. That is, there has been adopted a method which is referred to as scribe cutting which makes use of high toughness of glass. However, with respect to a plastic board which exhibits excellent flexibility compared to glass, that is, which possesses low toughness, the application of the scribe cutting method is difficult and hence, it is necessary to develop a cutting method which replaces the scribe cutting method.

SUMMARY OF THE INVENTION

As a method which replaces the scribe cutting method, there has been known a method which uses the radiation of laser beams. Cutting of a plastic board due to the radiation of laser beams has been already put into practice with respect to a single substrate. Further, also with respect to the two-sheet overlapped structure formed of a TFT board and a CF board for forming liquid crystal display devices or the like, so far as both boards are cut at the same portion, it has been proved by an actual cutting operation that the two-sheet overlapped structure can be cut in the same manner as the single-substrate cutting by properly selecting conditions such as a focal length, radiation power and a beam moving speed of laser beams.

However, when the above-mentioned terminal portion is cut, that is, when only the opposedly-facing CF board is cut, there has been a drawback that terminals which are formed on the terminal portion of the TFT board are damaged due to the relationship of transmissivity of laser beams with the CF board.

The present invention has been made to overcome the above-mentioned drawbacks of the related art, and it is an object of the present invention to provide a manufacturing method of a display device which can enhance quality, reliability and the like of a display panel which is formed using a plastic board by preventing damages on a terminal portion due to the radiation of laser beams in cutting a portion of a board corresponding to a terminal portion of the display panel by the radiation of laser beams.

To achieve such an object, the manufacturing method of a liquid crystal display device according to the present invention has the following constitution schematically.

(1) The present invention is directed to a manufacturing method of a display device in which a first substrate and a second substrate which faces the first substrate in an opposed manner are provided, the first substrate is a plastic substrate, a plurality of lines and a plurality of terminals are formed on a surface of the second substrate which faces the first substrate in an opposed manner, the plurality of terminals is formed on a terminal portion of the second substrate, the first substrate has a cutting line at a position which faces the terminal portion in an opposed manner, and the first substrate is cut along the cutting line so as to expose a portion of the terminal portion, wherein the manufacturing method of a display device includes the steps of: forming a groove having a predetermined depth in the first substrate by radiating laser beams to a surface of the first substrate on a side opposite to a surface of the first substrate which faces the second substrate in an opposed manner along the cutting line; and cutting the first substrate by applying a load along the groove.

(2) The laser beams may be carbon-dioxide-gas laser beams or excimer laser beams.

(3) The present invention is characterized in that a load is applied to the first substrate by a cutter made of metal or ceramic in the cutting step.

(4) The present invention is characterized in that the depth of the groove is 50% or less of a thickness of the first substrate.

(5) The present invention is characterized in that at least one optical film layer is stacked on the first substrate, and the depth of the groove is a depth which allows the groove to arrive at a layer closest to the second substrate.

(6) The present invention is characterized in that at least one optical film layer and at least one barrier film are stacked on the first substrate, and the depth of the groove is a depth which allows the groove to arrive at a layer closest to the second substrate except for the barrier film. Further, it is also characterized in that the barrier film is formed on the layer closest to the second substrate. Still further, it is characterized in that the barrier film is a film made of an inorganic material or a film formed by stacking an inorganic material layer and an organic material layer.

(7) The present invention is characterized in that color filter films are formed on the first substrate.

(8) The present invention is characterized in that the second substrate is a plastic substrate or a glass substrate.

(9) The present invention is characterized in that the manufacturing method of a display device further includes a step of forming a resin protective film by covering a cutting surface of the first substrate along the cutting line and at least a portion of the terminal portion of the second substrate with a resin after the cutting step.

(10) The present invention is characterized in that a cutting surface of the first substrate along the cutting line includes a first cutting surface and a second cutting surface which differ in a cross-sectional shape from each other, the second cutting surface is formed closer to the second substrate side than the first cutting surface, and the manufacturing method of a display device further includes a step of forming a resin protective film by covering the second cutting surface and at least a portion of the terminal portion of the second substrate with a resin.

(11) The present invention is characterized in that the resin is made of a material equal to a material of the first substrate or a material whose main component is equal to the material of the first substrate.

(12) The present invention is characterized in that at least one optical film layer is stacked on the first substrate, and the resin is formed of a material equal to a material of the second cutting surface or a material whose main component is equal to the material of the second cutting surface.

(13) The present invention is characterized in that a thermal expansion rate of the resin is equal to a thermal expansion rate of the first substrate or not less than 80% and not more than 120% of the thermal expansion rate of the first substrate.

(14) The present invention is characterized in that a film substrate is connected to the terminal portion, and the resin is formed so as to cover a connecting portion between the terminal portion and the film substrate.

(15) The present invention is characterized in that the first substrate and the second substrate have opposedly facing surfaces thereof laminated to each other by a sealing material with a predetermined gap therebetween, and the resin is formed adjacent to the sealing material.

(16) The present invention is characterized in that the display device is a liquid crystal display device.

Here, the present invention is not limited to the above-mentioned constitution and the constitution of an embodiment described later and various modifications are conceivable without departing from the technical concept of the present invention.

According to the present invention, the portion of the first substrate which faces the terminal portion in an opposed manner can be cut without damaging the terminal portion of the second substrate and hence, there is no possibility that the terminal portion is damaged whereby it is possible to prevent the terminal portion from being damaged. Accordingly, the present invention can acquire an extremely excellent advantageous that it is possible to realize a display device which exhibits high quality and high reliability.

Further, according to the present invention, by covering the terminal portion of the second substrate and the cutting surface of the first substrate with a resin for protecting the terminal portion, the durability of the display device can be enhanced.

BRIEF DESCRIPTION OF THE DRAWINGS

FIG. 1A and FIG. 1B are schematic views showing the constitution of a liquid crystal display panel for explaining an embodiment 1 of a manufacturing method of a display device according to the present invention, wherein FIG. 1A is a top plan view and FIG. 1B is a side view;

FIG. 4A to FIG. 4C are schematic views in which the plurality of liquid crystal display panels shown in FIG. 1A to FIG. 1B are mounted on a mother board for explaining the embodiment of the manufacturing method of a display device according to the present invention, wherein FIG. 4A is a top plan view, FIG. 4B is a side view, and FIG. 4C is a bottom plan view;

DESCRIPTION OF THE PREFERRED EMBODIMENTS

Hereinafter, specific embodiments of the present invention are explained in detail in conjunction with drawings showing the embodiments.

Embodiment 1

Figure 1A:
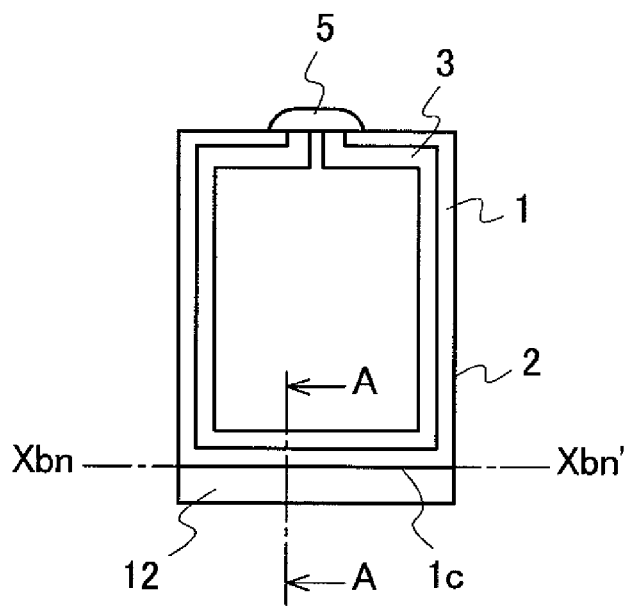
Figure 1B:
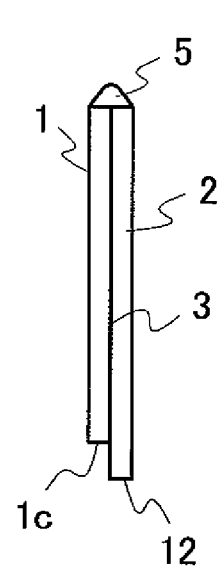

FIG. 1A and FIG. 1B are schematic views showing the constitution of a liquid crystal display panel for explaining a manufacturing method of a liquid crystal display device as one embodiment of a manufacturing method of a display device according to the present invention, wherein FIG. 1A is a top plan view of the liquid crystal display panel, and FIG. 1B is a side view of the liquid crystal display panel. Further, FIG. 2 is an enlarged cross-sectional view taken along a line A-A in FIG. 1A.

In FIG. 1A and FIG. 1B, the liquid crystal display panel is configured as follows. A first substrate 1 (also referred to as a color filter substrate 1 or a CF substrate 1) which is formed of a light transmitting plastic substrate having a thickness of approximately 0.2 mm and a second substrate 2 (also referred to as a thin film transistor substrate 2 or a TFT substrate 2) which is formed of a light transmitting plastic substrate on which a plurality of lines and a plurality of terminals are formed and has a thickness of approximately 0.2 mm are arranged to face each other in an opposed manner. A gap defined between both substrates in a pixel-electrode forming region is set to approximately 4 μm. Liquid crystal 4 is filled into a region which is surrounded by both substrates and a frame-shaped sealing material 3 formed between opposedly-facing peripheral portions of both substrates through a liquid crystal filling port. The liquid crystal filling port is sealed by an end seal 5.

Figure 2:
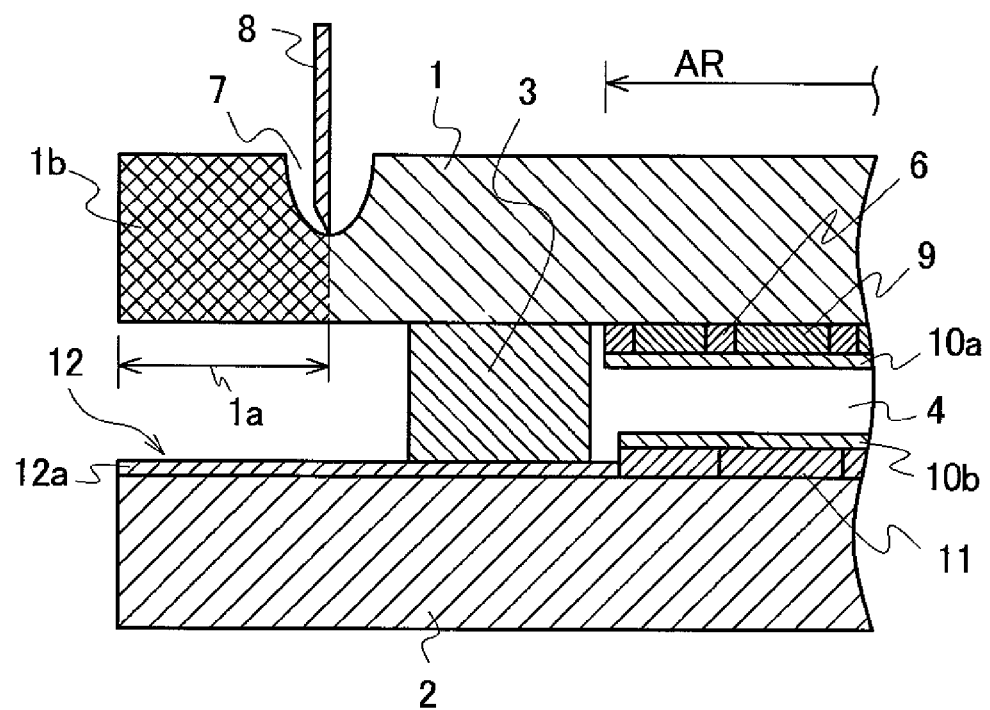
FIG. 2 is an enlarged cross-sectional view of an essential part taken along a line A-A in FIG. 1A.

FIG. 2 is an enlarged cross-sectional view taken along a line A-A in FIG. 1A. As shown in FIG. 2, a black matrix film 6 is formed on an inner surface of the first substrate 1 within an effective display region AR by applying black resin material obtained by dispersing carbon into an acrylic resin, for example, to the inner surface in a predetermined matrix array by coating.

Further, on a short-side edge portion of the first substrate 1, a groove 7 having a substantially elliptical cross section is formed. The groove 7 is formed for removing an extra portion 1a of the first substrate 1 by breaking. That is, the groove 7 is formed by radiating laser beams to a portion of the first substrate 1 which faces a terminal portion 12 of the second substrate 2 described later along the lengthwise direction of a short side of the first substrate 1. Thereafter, a load is applied to the first substrate 1 along the groove 7 using a cutter 8 made of metal or ceramics thus cutting the first substrate 1.

Figure 3:
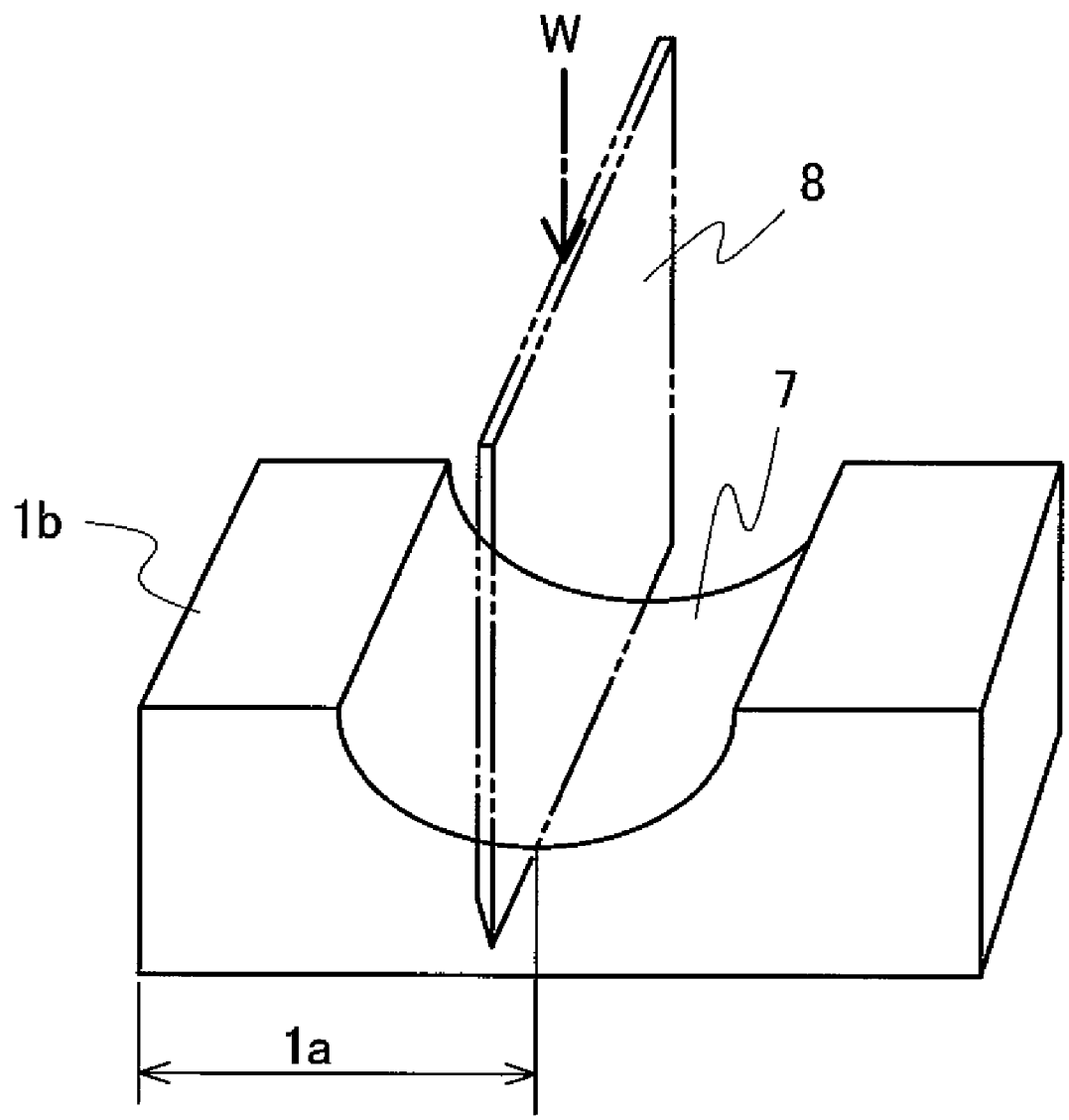
FIG. 3 is an enlarged perspective view of an essential part of a portion to be broken.

FIG. 3 is an enlarged perspective view of an essential part showing the constitution of a portion to be broken in FIG. 2. With respect to the portion to be broken, a curved laser mark formed by cutting due to the radiation of laser beams is formed on an inner wall surface of the groove 7, and a load is applied to the portion to be broken by a cutter 8 in the direction W.

Accordingly, the extra portion 1a of the first substrate 1 positioned at an outermost edge portion on a short side of the first substrate 1 is cut off, and a cut-off portion 1b is removed.

Further, as shown in FIG. 2, in respective spaces defined in the matrix-patterned black-matrix film 6 which is formed on an inner surface of the effective display region AR, respective color filter films 9 of red, green and blue are formed in predetermined arrangement respectively. Further, although not shown in the drawing, on a surface of the first substrate 1 on which the black-matrix film 6 and the respective color filter films 9 are formed, an over-coating film made of a light-transmitting acrylic resin material and a common electrode made of ITO are formed. Further, an alignment film 10a made of a polyimide material, for example, is formed below the over-coating film and the common electrode.

Further, on an inner surface of the second substrate 2 which is arranged to face the first substrate 1 in an opposed manner, pixels 11 each of which is constituted of a pixel electrode made of ITO, a thin film transistor functioning as a switching element for the selection of pixel and the like are arranged in a matrix array. Although not shown in the drawing, the pixel 11 may be configured such that a protective film made of silicon oxide, silicon nitride or the like, for example, is arranged above the thin film transistor, and the pixel electrode which is formed of an ITO electrode or the like, for example, is formed over the protective film and, then, an alignment film 10b which is made of polyimide or the like, for example, is formed over the pixel electrodes.

Further, by applying a load to the groove 7 which is formed in the short-side edge portion of the first substrate 1 in the same direction as the radiation direction of the laser beams, the extra portion 1a on the outermost edge portion shown in FIG. 2 is broken as a cut-off portion 1b using the groove 7 as a boundary. Further, as a cut-off surface, as described later, a curved stripe-shaped laser mark 7a formed by the radiation of the laser beams, and a mark 8a having an acute angle and a substrate broken surface 1c formed by the cutter 8 are exposed to the outside.

Further, on a terminal portion 12 of the second substrate 2, terminals 12a are formed. These terminals 12a are formed of a plurality of lead lines which are respectively connected to the pixel electrodes formed inside an effective display region AR. Accordingly, here established is the positional relationship in which the terminal portion 12 of the second substrate 2 and the groove 7 formed on the edge portion of the first substrate 1 are arranged to face each other in an opposed manner in a state that the terminal portion 12 and the groove 7 intersect with each other.

In such constitution, by forming the groove 7 in the edge portion of the first substrate 1 and by cutting the extra portion 1a as the cut-off portion 1b using the groove 7 as the boundary, there is no possibility that the radiation of laser beams arrives at the terminal portion 12 of the second substrate 2 and hence, it is possible to prevent the terminal portion 12 from being damaged thus preventing the terminals 12a from being damaged. Here, a depth of the groove 7 is preferably set to not more than 50% of a thickness of the first substrate 1.

Next, a manufacturing method of the liquid crystal display device having such constitution is explained in detail in conjunction with drawings.

Figure 4A:
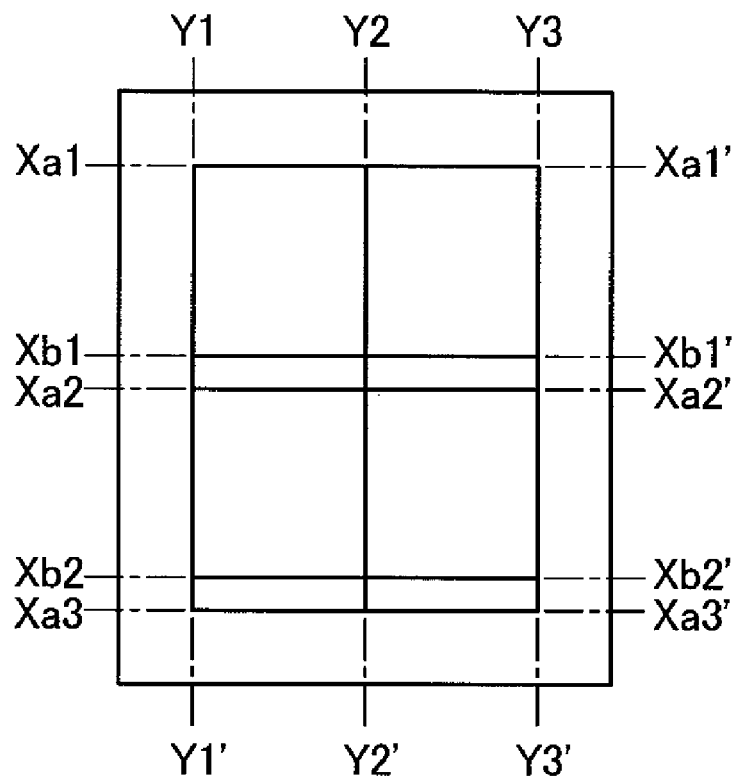
Figure 4B:
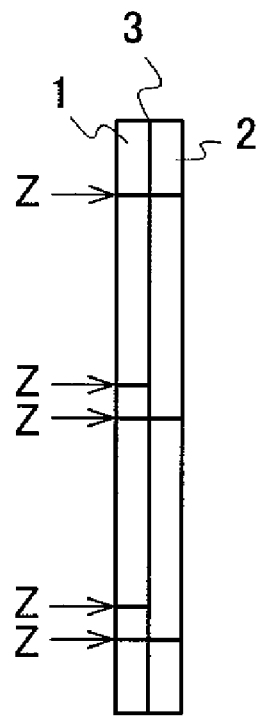
Figure 4C:
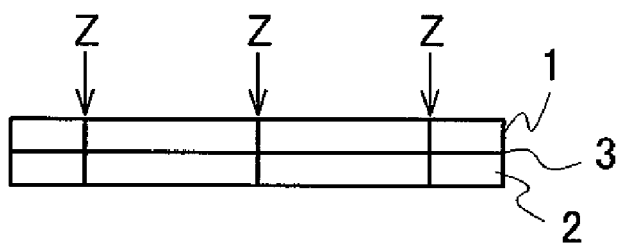

FIG. 4A to FIG. 4C are schematic views of an essential part of a mother board on which a plurality of liquid crystal display panels shown in FIG. 1A and FIG. 1B are mounted, wherein FIG. 4A is a top plan view, FIG. 4B is a side view, and FIG. 4C is a bottom plan view.

In FIG. 4A to FIG. 4C, for example, four pieces of liquid crystal display panels shown in FIG. 1A and FIG. 1B are mounted on a large-sized mother board having a longitudinal size of approximately 150 mm and a lateral size of approximately 150 mm, that is, a size of approximately 150 mm×150 mm. Liquid crystal is filled into a gap surrounded by both substrates and the sealing material 3 and, thereafter, laser beams are radiated to cut the mother board along cutting lines thus forming four liquid crystal display panels.

In this laser cutting, carbon-dioxide-gas laser beams having a wavelength of approximately 10 μm, an output of approximately 13 J, a frequency of approximately 300 Hz and a beam diameter of approximately 300 μm are used. Radiation condition is set by changing a moving speed of the laser beams and the number of times of radiation of laser beams. Laser beams are radiated in the direction indicated by an arrow Z from above the first substrate 1, and the radiation of laser beams is performed while moving on a cutting line Yn-Yn', a cutting line Xan-Xan' and a cutting line Xbn-Xbn' respectively in a reciprocating manner.

Here, in performing cutting along the cutting line Yn-Yn' and the cutting line Xan-Xan' (hereinafter, referred to as panel-outer-periphery cuttings), two substrates which overlap with each other (the first substrate 1 and the second substrate 2) have portions thereof cut at the same position. On the other hand, as shown in FIG. 2, in performing cutting along the cutting line Xbn-Xbn', only the edge portion of the first substrate 1 is cut for leaving the terminal portion 12 of the second substrate 2 which faces the first substrate 1 in an opposed manner. At this point of time, as described previously, a drawback that the terminal portion 12 is damaged by the radiation of the laser beams arises.

In this embodiment, to overcome the above-mentioned drawback, as shown in FIG. 2 and FIG. 4A to FIG. 4C, in performing cutting along the cutting line Xbn-Xbn', the groove is continuously formed along the cutting line using the carbon-dioxide-gas (CO2) laser beams and, thereafter, outer peripheries of the panels are cut using the same laser beams thus forming individual liquid crystal display panels. Then, the extra portion of each liquid crystal display panel is removed using a metal cutter such that a load is applied to the metal cutter along an area in the vicinity of a widthwise center portion of the groove in the same direction as the laser beam radiating direction thus breaking the extra portion.

Figure 5:
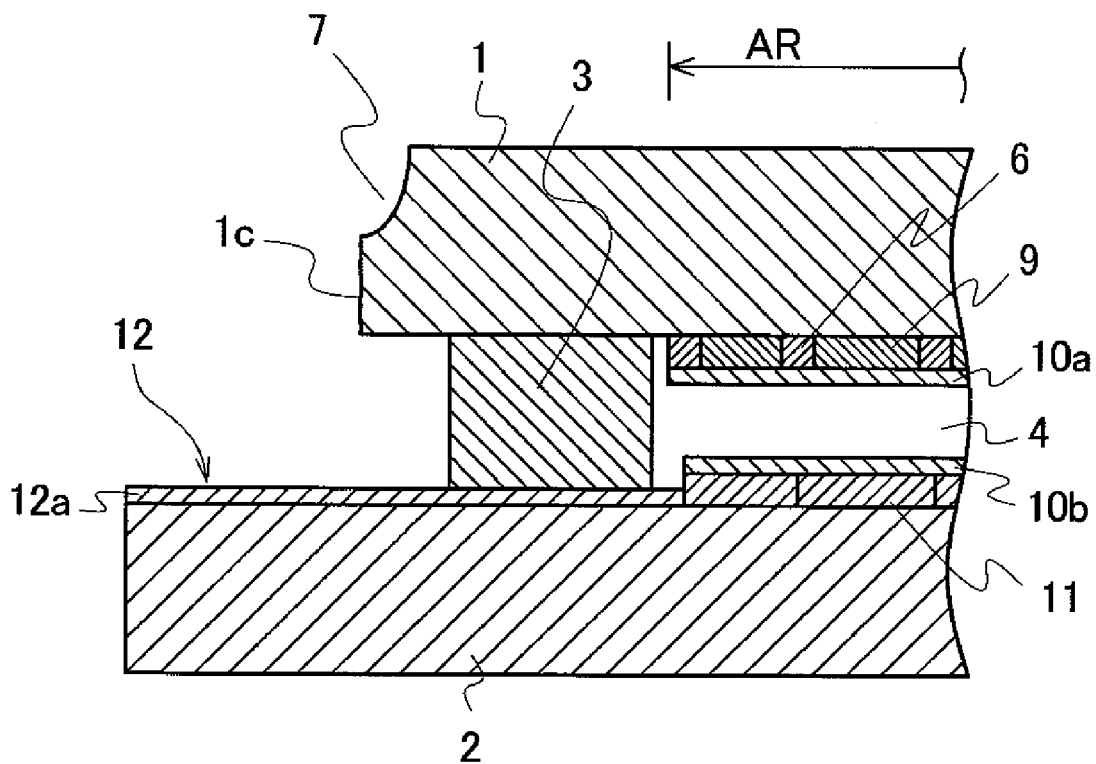
FIG. 5 is an enlarged cross-sectional view of an essential part of a broken portion of the liquid crystal display panel for explaining the manufacturing method of the display device according to the present invention.

Here, the cutting of the outer periphery of the liquid crystal display panel is performed under a condition that a laser moving speed is set to 18 mm/sec and the number of times of radiation is set to 5. The groove is formed under a condition that a laser moving speed is set to 18 mm/sec, and the number of times of radiation is set to 1, and a depth of the groove is set to ≅105 μm. Further, in breaking the liquid crystal display panel using the metal cutter, a steel cutter having a length of ≅100 mm, a width of ≅20 mm, a thickness of 0.3 mm, and a cutting-edge angle of ≅42° is used. Here, a pressure is applied to the steel cutter by a press so as to allow a blade of the cutter to cut into a bottom surface portion of the groove forming portion which is formed by the radiation of laser beams until a cut-into depth of the cutting edge of the steel cutter becomes ≅20 μm from the bottom surface portion of the groove whereby the extra portion is broken. Due to such operations, as shown in FIG. 5, a portion of the first substrate which faces the terminal portion 12 is cut.

Here, as a series of steps for cutting the liquid crystal display panel besides the above-mentioned steps of cutting in this embodiment, a series of steps for cutting consisting of the formation of the groove, the breaking of the extra portion and the cutting of outer periphery of the panel, and a series of steps for cutting consisting of the cutting of the outer periphery of the panel, the formation of the groove and the breaking of the extra portion are considered.

Further, in this embodiment, the carbon oxide gas laser beams are used for forming the groove, and the steel cutter having a cutting-edge angle of 42° is used in breaking the panel. However, the present invention is not limited to these laser beams and steel cutter. For example, with respect to laser beams, excimer laser beams, femto-second laser beams or the like may be used in place of carbon dioxide laser beams. The cutter may be a cemented carbide cutter or a ceramic cutter in place of the steel cutter. Here, it is needless to say that radiation intensity and a moving speed of laser beams or a manufacturing condition of the cutter such as a cutting-edge angle are appropriately selected depending to time and situation.

Figure 6:
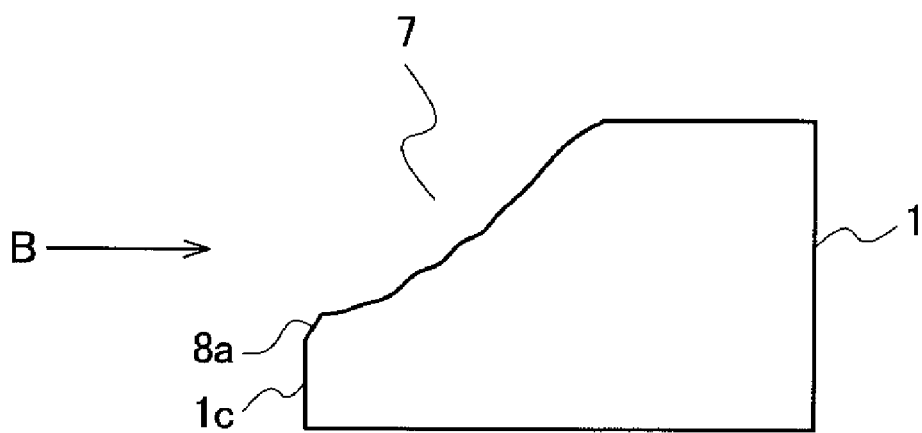
FIG. 6 is a cross-sectional view of an essential part taken along a line A-A in FIG. 1A for explaining the structure of the broken portion of a first substrate.
Figure 7:
FIG. 7 is a side view of an essential part of the broken portion as viewed in the direction indicated by an arrow B in FIG. 6.

FIG. 6 and FIG. 7 are views for explaining the structure of a broken portion of the first substrate 1, wherein FIG. 6 is a cross-sectional view of an essential part taken along a line A-A in FIG. 1A, and FIG. 7 is a side view of an essential part as viewed in the direction indicated by an arrow B in FIG. 6. As shown in FIG. 6 and FIG. 7, on the inner wall surface of the groove 7, the curved stripe-shaped laser mark 7a is formed by the radiation of laser beams and the mark 8a having an acute angle is formed by the cutter 8. Further, the substrate broken surface 1c is formed by breaking the extra portion 1a of the first substrate 1.

In such a manufacturing method, a portion of the first substrate 1 where the groove 7 is formed has a thickness smaller than a thickness of other portion of the first substrate 1 and hence, a strength of the portion where the groove 7 is formed is lower than a strength of other portion. When a load is vertically applied to a bottom surface portion of the groove 7 by the cutter 8 having an acute tip portion in the groove-formed-substrate direction, the load vertically acts on a cutting edge of the cutter 8 in a concentrated manner. Accordingly, the cutter is cut into the first substrate 1 along the groove where the first substrate 1 exhibits a small strength and hence, the first substrate 1 is surely broken along the cutter 8.

Further, the above-mentioned groove 7 is formed in the first substrate 1 which faces the second substrate 2 on which the terminal portion 12 is formed, and the cutter 8 is also cut into a thin remaining portion of the first substrate 1 after the formation of the groove 7. Accordingly, it is possible to cut the first substrate 1 without damaging the terminal portion 12.

Figure 8:
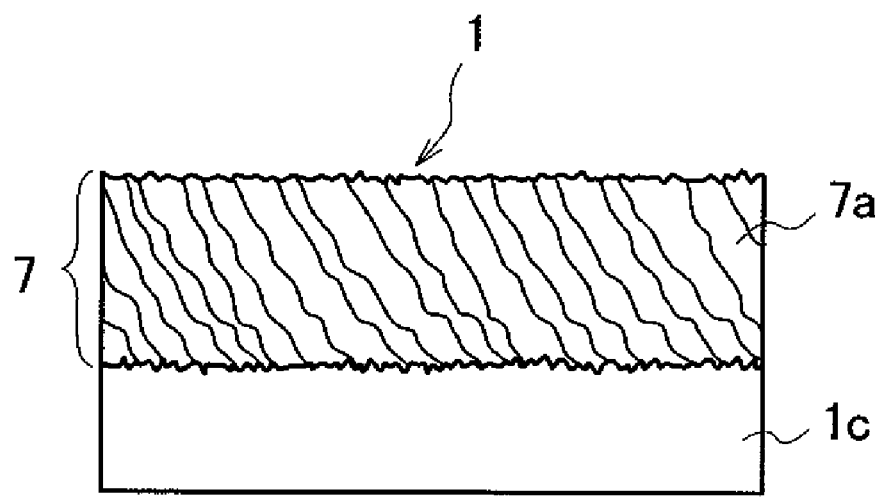
FIG. 8 is an enlarged plan view of an essential part of a comparison example showing a broken surface by breaking after forming only a first groove by radiating laser beams along a cutting line of a terminal portion of the first substrate.

FIG. 8 is an enlarged plan view of an essential part of a comparison example showing a broken surface of the first substrate 1 when the first substrate 1 is broken by performing only the formation of the groove 7 by radiating laser beams along the cutting line of the first substrate 1 which faces the terminal portion 12 in an opposed manner. As shown in FIG. 8, on an inner wall surface of the groove 7, a curved stripe-shaped laser mark 7a is formed along an inner peripheral surface of the groove 7 due to the radiation of laser beams.

Due to such an operation, a substrate broken surface 1c formed by the breaking of the extra portion of the first substrate 1 is continuously formed on a bottom portion of the groove 7.

In this manner, when the cutter 8 is not used, the mark 8a formed by the cutter 8 does not remain so that the broken surface of the first substrate 1 differs from the broken surface of the first substrate 1 according to the present invention.

Embodiment 2

Figure 9:
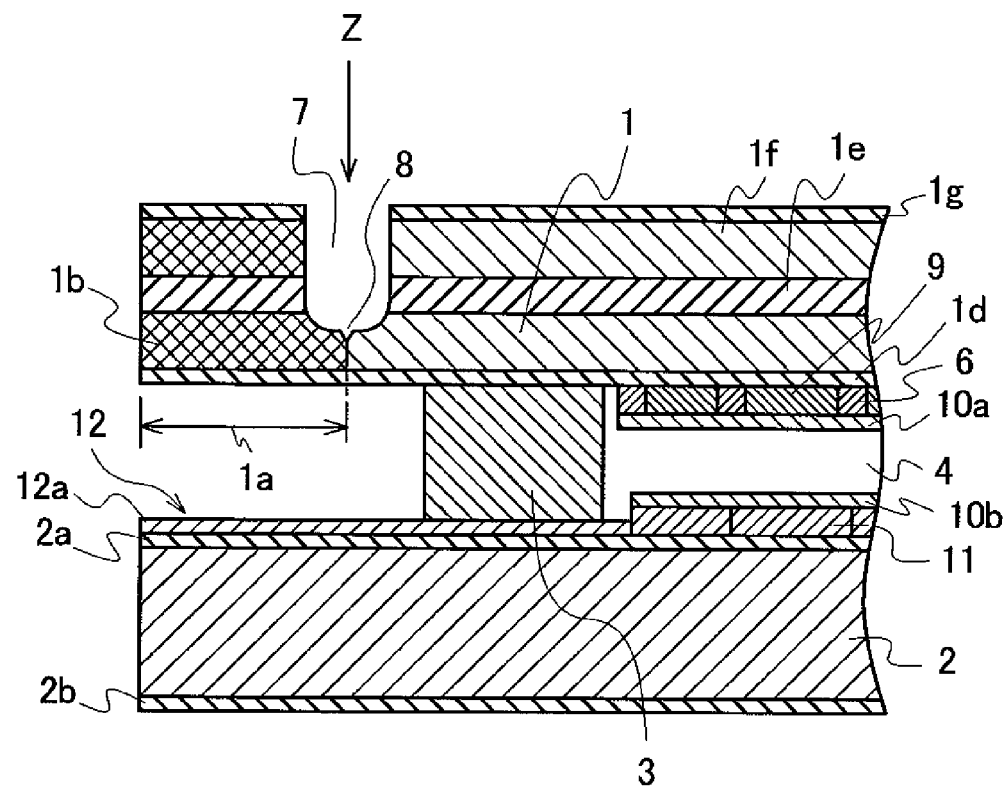
FIG. 9 is a cross-sectional view of an essential part of a cut portion for explaining another embodiment of the manufacturing method of a display device according to the present invention.

FIG. 9 is a cross-sectional view of an essential part of a cut portion for explaining another embodiment of the manufacturing method of the display device according to the present invention by taking a liquid crystal display device as an example. In FIG. 9, parts identical with the parts shown in the above-mentioned drawings are given same numerals and their explanation is omitted.

In the liquid crystal display device of the embodiment 1, the explanation is made with respect to the case in which the first substrate 1 is formed of a single-layered substrate. However, this embodiment is directed to the a case in which the first substrate 1 is formed of a multi-layered substrate where a polarizer layer and an optical film having phase-difference property are formed on a liquid crystal display panel in a stacked manner. The explanation of this embodiment is made in conjunction with FIG. 9.

In FIG. 9, in the liquid crystal display device of this embodiment, a first light transmitting barrier film 1d is arranged on a lower surface of the first substrate 1 by adhesion. A polarizer layer 1e is arranged on an upper surface of the first substrate 1 by adhesion. A third substrate 1f which is formed of a light transmitting plastic substrate is arranged on the polarizer layer 1e by adhesion. Further, a second light transmitting barrier film 1g is arranged on a front surface of the third substrate 1f by adhesion. Further, on an upper surface and a lower surface of the second substrate 2, a third light transmitting barrier film 2a and a fourth light transmitting barrier film 2b are respectively arranged by adhesion in the same manner as the above-mentioned second light transmitting barrier film 1g thus forming the so-called multi-layered substrate structure.

In such multi-layered substrate structure, it is preferable to set a depth of a groove 7 which is formed by the radiation of laser beams so that the groove end reaches a position deeper than a thickness of the polarizer layer 1e. Further, when the number of layers of the multi-layered substrate structure is further increased, it is preferable to set the depth of the groove 7 so that the first groove end reaches a position close to a deepest light transmitting barrier film 1d of the first light transmitting plastic substrate 1. Here, the groove 7 is not formed in the light transmitting barrier film 1*d*. That is, it is desirable to set the depth of the groove 7 so that the groove end reaches a layer closest to the second substrate 2 except for the barrier film 1*d*. Further, when the multi-layered substrate structure is configured to have no barrier film on a surface of the first substrate 1 which faces the second substrate 2, it is desirable to set the depth of the groove 7 so that the groove end reaches a layer closest to the second substrate 2.

The above-mentioned barrier film is provided for preventing lines, electrodes and the like which are formed on the first substrate 1 and the second substrate 2 from being corroded or moistened. Further, the above-mentioned barrier film is formed of an inorganic material layer or a stacked body formed of an inorganic material layer and an organic material layer, for example.

Although the light transmitting barrier film is used in the above-mentioned embodiment, depending on the application or the usage of the display device, it may be possible to prevent the corrosion or moistening of the lines, the electrodes and the like using a light reflective barrier film. In this case, the light transmitting barrier film may also function as a light reflective film.

Embodiment 3

Figure 10:
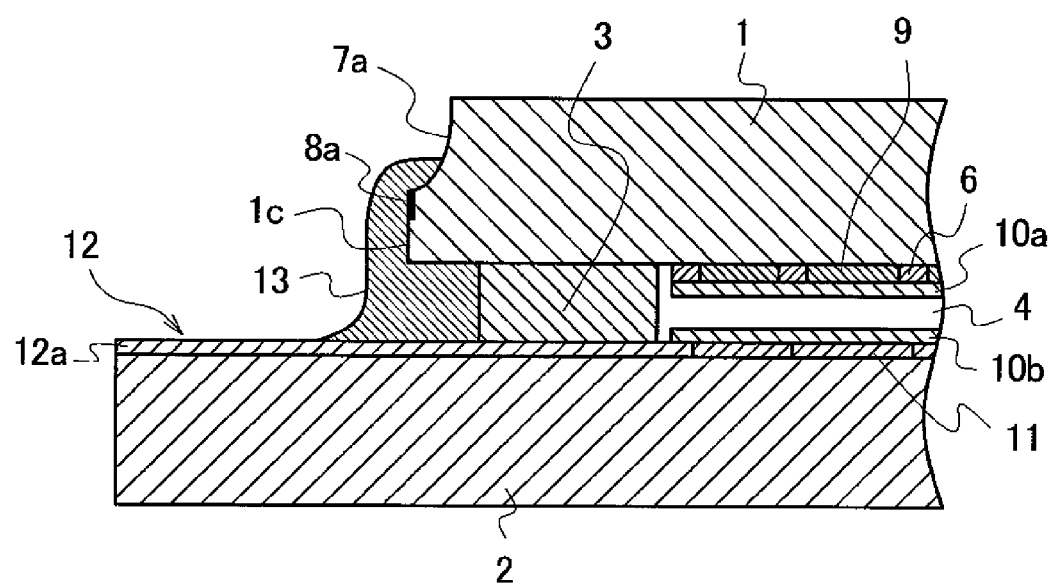
FIG. 10 is a cross-sectional view of an essential part of a liquid crystal display panel for explaining still another embodiment of the manufacturing method of the display device according to the present invention.

FIG. 10 is a view for explaining still another embodiment of the manufacturing method of the display device according to the present invention. In FIG. 10, parts identical with the parts shown in the above-mentioned drawings are given same numerals and their explanation is omitted. In FIG. 10, with respect to the broken portion of the liquid crystal display panel shown in FIG. 5, a resin 13 is applied to the broken portion by coating for protecting the broken portion. That is, the resin 13 covers the substantially whole surface of the groove 7 formed in the first substrate 1 at a position where the groove 7 faces the terminal portion 12 in an opposed manner, the mark 8*a* having an acute angle formed by the cutter 8, and the broken portion of the substrate broken surface 1*c*. Further, the resin 13 is filled into a gap defined between the first substrate 1 and the second substrate 2 so that the resin 13 is brought into contact with the sealing material 3.

The resin 13 may be the same material as the first substrate 1 and the second substrate 2 which has the substantially same thermal expansion ratio as the first substrate 1 and the second substrate 2. Alternatively, the resin 13 may be an ultraviolet curing resin material having a thermal expansion ratio which is lower than thermal expansion ratios of constitutional materials of the broken portion by not more than 20%. The resin material is applied to the broken portion using a dispenser by coating, for example, and, thereafter, the resin material is fixedly secured to the broken portion by curing the resin material with the radiation of ultraviolet rays. Here, in using a composite material which is produced by adding an inorganic material to the resin 13, for example, an expansion coefficient of an organic material contained in the constitutional material is taken into consideration.

In this embodiment, as a material for forming the first substrate 1 and the second substrate 2, a resin constituted of a silicone resin composition described in JP-A-2004-123936 is used. Here, the resin 13 is made of a material which is obtained by adding MEK (methyl ethyl ketone) to the same silicone resin (resin before curing) used as the material of the first substrate 1 and the second substrate 2. The resin 13 is applied by coating using the dispenser, MEK drying is performed and, thereafter, the resin is cured by radiating ultraviolet rays (UV) to the resin. Further, to prevent the corrosion of the terminals 12*a* attributed to the adhesion of moisture to the terminal portion, the resin 13 is filled in the gap defined between the first substrate 1 and the second substrate 2 and the resin 13 is brought into contact with the sealing material 3. Here, the above-mentioned MEK is added for enhancing the coating operation of the resin. There is no limitation on whether MEK is added or not, an addition quantity of MEK and the like.

Further, as a constitutional material of the resin 13, for example, a radical polymerization resin which uses a cage-type silsesquioxane resin or the like as a raw material may preferably be used. Here, the resin 13 may preferably be made of the same material as the first substrate 1 or the same material as a layer of the substrate broken surface 1*c*.

Due to such a manufacturing method, it is possible to prevent the breaking of the liquid crystal display panel attributed to the generation of progressive cracks starting from the acute-angled mark 8*a* formed in the groove 7 of the first substrate 1 by the cutter 8, the expansion of cracks due to an external stress or a thermal stress or the like. Further, by applying the resin 13 to the broken portion such that the resin 13 is filled into the gap defined between the first substrate 1 and the second substrate 2 and by bringing the resin 13 into contact with the sealing material 3, it is possible to prevent the corrosion of the terminals 12*a* attributed to the adhesion of moisture or the like to the terminal portion thus enhancing the reliability of the liquid crystal display panel.

Embodiment 4

Figure 11:
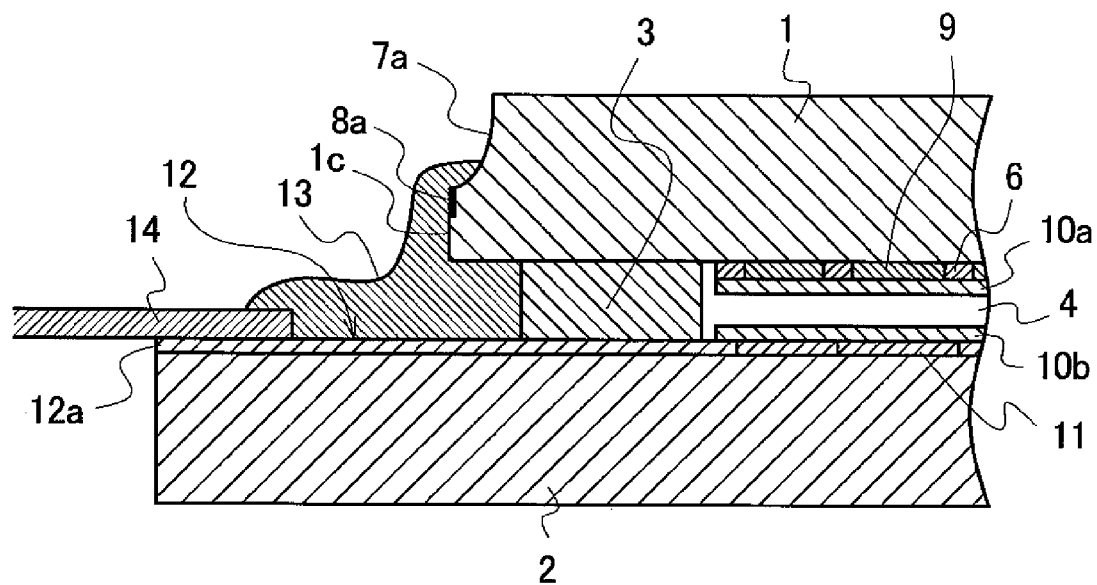
FIG. 11 is a cross-sectional view of an essential part of a liquid crystal display panel for explaining still another embodiment of the manufacturing method of the display device according to the present invention.

FIG. 11 is a view for explaining still another embodiment of the manufacturing method of the display device according to the present invention. In FIG. 11, parts identical with the parts shown in the above-mentioned drawings are given same numerals and their explanation is omitted. In FIG. 11, the broken portion of the liquid crystal display panel shown in FIG. 5 is protected by the resin 13 as follows. A film substrate 14 (flexible printed circuit board) which supplies electricity and electric signals to the liquid crystal display panel is bonded to a terminal portion 12 of a second substrate 2 by thermocompression bonding or the like, for example, thus electrically connecting the film substrate 14 and terminals 12*a* with each other. Thereafter, the resin 13 is applied by coating so as to cover the whole surface of the broken portion. Further, the resin 13 is brought into contact with a sealing material 3 arranged in a gap defied between the first substrate 1 and the second substrate 2 and an upper portion of the terminal portion 12 of the film substrate 14. Here, the resin 13 is equal to the resin used in the embodiment 3.

Due to such a manufacturing method, in addition to the above-mentioned advantageous effects, a mechanical strength of the terminal portion 12 of the second substrate 2 and a mechanical strength of the terminal portion of the film substrate 14 can be enhanced and hence, it is possible to enhance the connection reliability of the liquid crystal display panel.

Embodiment 5

Figure 12:
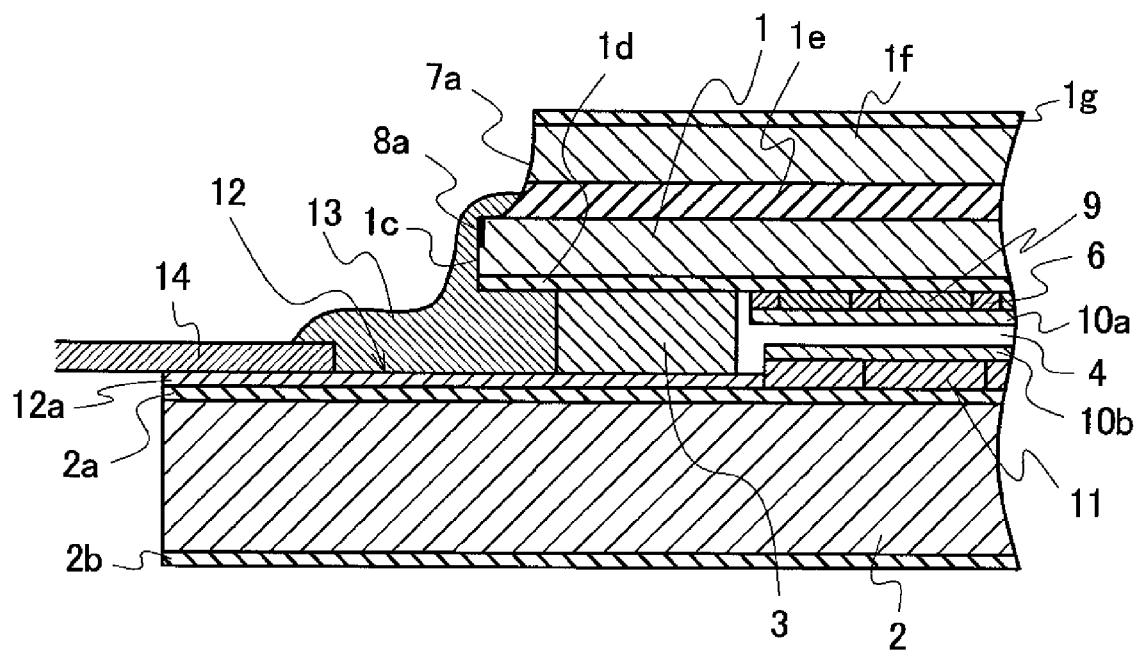
FIG. 12 is a cross-sectional view of an essential part of a liquid crystal display panel for explaining still another embodiment of the manufacturing method of the display device according to the present invention.

FIG. 12 is a view for explaining still another embodiment of the manufacturing method of the display device according to the present invention. In FIG. 12, parts identical with the parts shown in the above-mentioned drawings are given same numerals and their explanation is omitted. In FIG. 12, the broken portion of the liquid crystal display panel shown in FIG. 9 is protected by a resin 13 as follows. A film substrate 14 which supplies electricity and electric signals to the liquid crystal display panel is bonded to a terminal portion 12 of the second substrate 2 by thermocompression bonding or the like, for example, thus electrically connecting the film substrate 14 and respective electrode lines 12a with each other. Thereafter, the resin 13 is applied by coating so as to cover at least the broken portion extending to a layer closest to the second substrate 2 except for a barrier film 1d of the first substrate 1. Further, the resin 13 is applied by coating so as to cover and protect the broken portion along edge surfaces of respective functional layers up to a terminal portion of the film substrate 14. Here, the resin 13 is equal to the resin used in the embodiment 3 and the embodiment 4.

Also in such a manufacturing method, in addition to the above-mentioned manner of operation and advantageous effects, a mechanical strength of the terminal portion 12 of the second substrate 2 and a mechanical strength of the terminal portion of the film substrate 14 can be enhanced. Further, it is possible to prevent the lowering of functions attributed to moisture adhered to cut surfaces of the respective stacked functional layers and hence, the reliability of the liquid crystal display panel having the multi-layered substrate structure can be enhanced.

Here, in the above-mentioned embodiment, the explanation has been made with respect to the case in which the substrate which forms the lead terminal portion on the edge portion thereof is formed by using a light transmitting plastic substrate made of a plastic material. However, it is needless to say that, even when this second substrate 2 is formed by using a light transmitting glass substrate in place of the light transmitting plastic substrate, the present invention can acquire advantageous effects substantially equal to the above-mentioned advantageous effects.

Further, in the above-mentioned embodiments, the explanation has been made with respect to the constitution of the liquid crystal display device. However, the present invention is not limited to the liquid crystal display device, and it is needless to say that the present invention can acquire the substantially equal advantageous effects even when the present invention is applied to the constitution of other display device such as an organic EL display device.

What is claimed is:

1. A manufacturing method of a display device in which a first substrate and a second substrate which faces the first substrate in an opposed manner are provided, the first substrate is a plastic substrate, a plurality of lines and a plurality of terminals are formed on a surface of the second substrate which faces the first substrate in an opposed manner, the plurality of terminals is formed on a terminal portion of the second substrate, the first substrate has a cutting line at a position which faces the terminal portion in an opposed manner, and the first substrate is cut along the cutting line so as to expose a portion of the terminal portion, the manufacturing method of a display device comprising the steps of:
   forming a groove having a predetermined depth in the first substrate by radiating laser beams to a surface of the first substrate on a side opposite to a surface of the first substrate which faces the second substrate in an opposed manner along the cutting line; and
   cutting the first substrate by applying a load along the groove.

2. A manufacturing method of a display device according to claim 1, wherein the laser beams are carbon-dioxide-gas laser beams.

3. A manufacturing method of a display device according to claim 1, wherein the laser beams are excimer laser beams.

4. A manufacturing method of a display device according to claim 1, wherein a load is applied to the first substrate by a cutter made of metal or ceramic in the cutting step.

5. A manufacturing method of a display device according to claim 1, wherein the depth of the groove is 50% or less of a thickness of the first substrate.

6. A manufacturing method of a display device according to claim 1, wherein at least one optical film layer is stacked on the first substrate, and the depth of the groove is a depth which allows the groove to arrive at a layer closest to the second substrate.

7. A manufacturing method of a display device according to claim 1, wherein at least one optical film layer and at least one barrier film are stacked on the first substrate, and the depth of the groove is a depth which allows the groove to arrive at a layer closest to the second substrate except for the barrier film.

8. A display device according to claim 7, wherein the barrier film is formed on the layer closest to the second substrate.

9. A display device according to claim 7, wherein the barrier film is a film made of an inorganic material or a film formed by stacking an inorganic material layer and an organic material layer.

10. A manufacturing method of a display device according to claim 1, wherein color filter films are formed on the first substrate.

11. A manufacturing method of a display device according to claim 1, wherein the second substrate is a plastic substrate.

12. A manufacturing method of a display device according to claim 1, wherein the second substrate is a glass substrate.

13. A manufacturing method of a display device according to claim 1 further comprising a step of forming a resin protective film by covering a cutting surface of the first substrate along the cutting line and at least a portion of the terminal portion of the second substrate with a resin after the cutting step.

14. A manufacturing method of a display device according to claim 1, wherein a cutting surface of the first substrate along the cutting line includes a first cutting surface and a second cutting surface which differ in a cross-sectional shape from each other,
   the second cutting surface is formed closer to the second substrate side than the first cutting surface, and
   the manufacturing method of a display device further includes a step of forming a resin protective film by covering the second cutting surface and at least a portion of the terminal portion of the second substrate with a resin.

15. A manufacturing method of a display device according to claim 13, wherein the resin is formed of a material equal to a material of the first substrate or a material whose main component is equal to the material of the first substrate.

16. A manufacturing method of a display device according to claim 14, wherein at least one optical film layer is stacked on the first substrate, and the resin is formed of a material equal to a material of the second cutting surface or a material whose main component is equal to the material of the second cutting surface.

17. A manufacturing method of a display device according to claim 13, wherein a thermal expansion rate of the resin is equal to a thermal expansion rate of the first substrate or not less than 80% and not more than 120% of the thermal expansion rate of the first substrate.

18. A manufacturing method of a display device according to claim 13, wherein a film substrate is connected to the terminal portion, and the resin is formed so as to cover a connecting portion between the terminal portion and the film substrate.

19. A manufacturing method of a display device according to claim 13, wherein the first substrate and the second substrate have opposedly facing surfaces thereof laminated to each other by a sealing material with a predetermined gap therebetween, and the resin is formed adjacent to the sealing material.

20. A manufacturing method of a display device according to claim 1, wherein the display device is a liquid crystal display device.

* * * * *